United States Patent [19]

Parzygnat

[11] Patent Number: 4,725,120

[45] Date of Patent: Feb. 16, 1988

[54] CONNECTOR APPARATUS

[75] Inventor: William J. Parzygnat, Perth Amboy, N.J.

[73] Assignee: American Telephone and Telegraph Company, AT&T Bell Laboratories, Murray Hill, N.J.

[21] Appl. No.: 664,701

[22] Filed: Oct. 25, 1984

[51] Int. Cl.[4] .................................................. G02B 6/40
[52] U.S. Cl. .................................. 350/96.22; 350/96.20
[58] Field of Search ................. 350/96.21, 96.22, 96.20

[56] References Cited

U.S. PATENT DOCUMENTS

| | | | |
|---|---|---|---|
| 4,178,068 | 12/1979 | Hoover | 350/96.22 |
| 4,274,708 | 6/1981 | Cocito et al. | 350/96.21 |
| 4,279,467 | 7/1981 | Borsuk et al. | 350/96.21 |
| 4,281,892 | 8/1981 | Sitabkhan | 350/96.21 |
| 4,300,815 | 11/1981 | Malsot et al. | 350/96.20 |
| 4,309,071 | 1/1982 | Prunier | 350/96.21 |
| 4,320,938 | 3/1982 | Gunnersen et al. | 350/96.21 |
| 4,325,607 | 4/1982 | Carlsen | 350/96.21 |
| 4,327,964 | 5/1982 | Haesly et al. | 350/96.20 |
| 4,330,172 | 5/1982 | Monaghan et al. | 350/96.21 |
| 4,353,619 | 10/1982 | Parr | 350/96.21 |
| 4,353,620 | 10/1982 | Schultz | 350/96.21 |
| 4,354,731 | 10/1982 | Mouissie | 350/96.21 |
| 4,367,011 | 1/1983 | Monaghan | 350/96.21 |
| 4,370,022 | 1/1983 | Johnson | 350/96.21 |
| 4,406,514 | 9/1983 | Hillegonds et al. | 350/96.21 |

OTHER PUBLICATIONS

"Designers Guide to Fiber Optics", Amp Corporated, Harrisburg, Pa., copyright 1982, pp. 82-87.

*Primary Examiner*—James W. Davie
*Assistant Examiner*—Robert E. Wise
*Attorney, Agent, or Firm*—Dwight A. Marshall

[57] ABSTRACT

Connector apparatus for interconnecting optical fiber cables. The apparatus comprises a pair of plug members each holding a truncated pyramid configured member universally mounting a substrate device terminating light carrying fibers of optical fiber cables. A sleeve member is arranged to slidably receive each substrate device inserted in one end thereof and apply quadrantal forces to both substrate devices to align and optically couple together corresponding ones of the fibers terminated on each substrate device.

16 Claims, 10 Drawing Figures

CONNECTOR APPARATUS

FIELD OF THE INVENTION

This invention relates to connector apparatus. In particular it relates to connector apparatus arranged to interconnect optical fiber cables and to connect optical fiber cables with circuit boards.

BACKGROUND OF THE INVENTION

Optical fiber cables are being used with increasing frequency in the Communications and Electronic Industry to transmit and receive voice, data and information signals. Optical fiber cables, as used in the Communications Industry, consist of a number of light carrying conductors or fibers that may individually appear in the cable or appear as polymer ribbons each holding an array of the fibers. Typically, each light carrying fiber comprises a filamentary core region having a high index of refraction and is surrounded by a cladding region having a lower index of refraction. The fiber is then coated with a polymer material.

In interconnecting optical fiber cables it is necessary to align the filamentary core regions of two corresponding fibers and abut the ends together to obtain a low coupling loss. Substrate devices are oftentimes used to terminate the fibers which are each positioned in parallel channels formed on one chip substrate with another chip substrate positioned on top thereof to form the substrate device. One end of the substrate device is polished such that the ends of the fibers are located in the end perpendicular to the end planar surface of the substrate device. In interconnecting optical fiber cables the polished end of one substrate device terminating fibers of a cable is aligned with and abutted against the polished end of another substrate device terminating fibers of a second cable. Both substrate devices are mechanically locked together to prevent one substrate device from being disengaged with the other. In another arrangement complex electrical switching apparatus is arranged to hold several substrate devices and mechanically switch one substrate device in and out of alignment with another substrate device for the purpose of interconnecting optical fiber cables together.

Communication and electronic systems often include plug-in type of circuit boards that are inserted into equipment mounting apparatus to engage backplanes for interconnecting the circuit boards with inter-apparatus cabling. Although component apparatus for modulating and demodulating signals onto optical fibers may be assembled on plug-in circuit boards a problem arises with the aforementioned interconnection locking and switching apparatus in enabling plug-in circuit boards to be installed in equipment mounting apparatus without requiring the operation of switching or the assembly and disassembly of connector locking apparatus. Similarly, a problem arises in the use of locking and switching apparatus to interconnect optical fiber cables together so that equipment mounting frames may be easily installed at a system location and quickly coupled together to form a working system.

The foregoing and other problems are solved and a technical advance is achieved by connector apparatus arranged for use in enabling optical fiber cables to be slidably coupled together and for enabling optical apparatus installed on a plug-in circuit board to be slidably coupled with an optical fiber cable terminated on a backplane as the circuit board is installed in equipment mounting apparatus.

SUMMARY OF THE INVENTION

In the exemplary embodiment of the invention a connector for interconnecting optical fiber cables comprises apparatus for universally mounting substrate devices terminating light carrying fibers of the optical fiber cables. The connector apparatus is further arranged for separably receiving the universally mounting apparatus and applying spring forces on the terminating substrate devices to axially align and optically couple together corresponding ones of fibers terminated on the substrate devices.

In accordance with one feature of the invention, connector apparatus for interconnecting light carrying fibers of optical fiber cables comprises a pair of plug members each having a truncated pyramid configured member arranged to accept ones of the fibers and support a substrate device terminating the fibers with universal movement of the substrate device about a center line of the plug member.

In accordance with another feature of the invention, connector apparatus for interconnecting optical fiber cables comprises a sleeve member arranged to slidably receive and self align substrate devices terminating fiber conductors of each optical fiber cable and apply quadrantal spring forces thereto to axially align and couple fiber conductors terminated on one substrate device with corresponding fiber conductors terminated on another substrate device.

In accordance with another feature of the invention, a sleeve member of connector apparatus arranged for the interconnection of cables comprises first and second pairs of opposing leaf springs positioned in an inner channel of the sleeve member with each located at a right angle to another and each having an arcuate center section extending toward a center line of the sleeve member for slidably receiving conductor terminating substrate devices and applying quadrantal forces thereto to axially align and optically couple together corresponding ones of the conductors.

In accordance with another feature of the invention, plug members of connector apparatus arranged for the interconnection of optical fiber cables comprises a spacer member positioned in one end of a channel of a retaining member adjacent the base section of a truncated pyramid member held by the retaining member to enable universal movement of a fiber terminating substrate device supported by the truncated end of the pyramid member.

Also in accordance with the invention, connector apparatus for interconnecting optical fiber cable through a backplane of equipment mounting apparatus with a plug-in circuit board comprises a housing member having first and second sections with the first section sized for engagement with the backplane and with the sections having interconnected chambers for holding a sleeve member extended through the backplane. Each chamber of the housing member is sized to receive a first plug member holding a substrate device terminating fiber conductors of an optical fiber cable and a second plug member holding a substrate device terminating fiber conductors coupled with the circuit board with each substrate device slidably inserted in a sleeve member having leaf springs applying quadrantal forces to the substrate device to axially align and couple together corresponding fiber conductors terminated on each substrate.

DESCRIPTION OF THE DRAWING

The foregoing as well as other objects, features and advantages of the invention will be more apparent from a description of the drawing in which.

DESCRIPTION OF THE INVENTION

Apparatus Description

Figure 1:
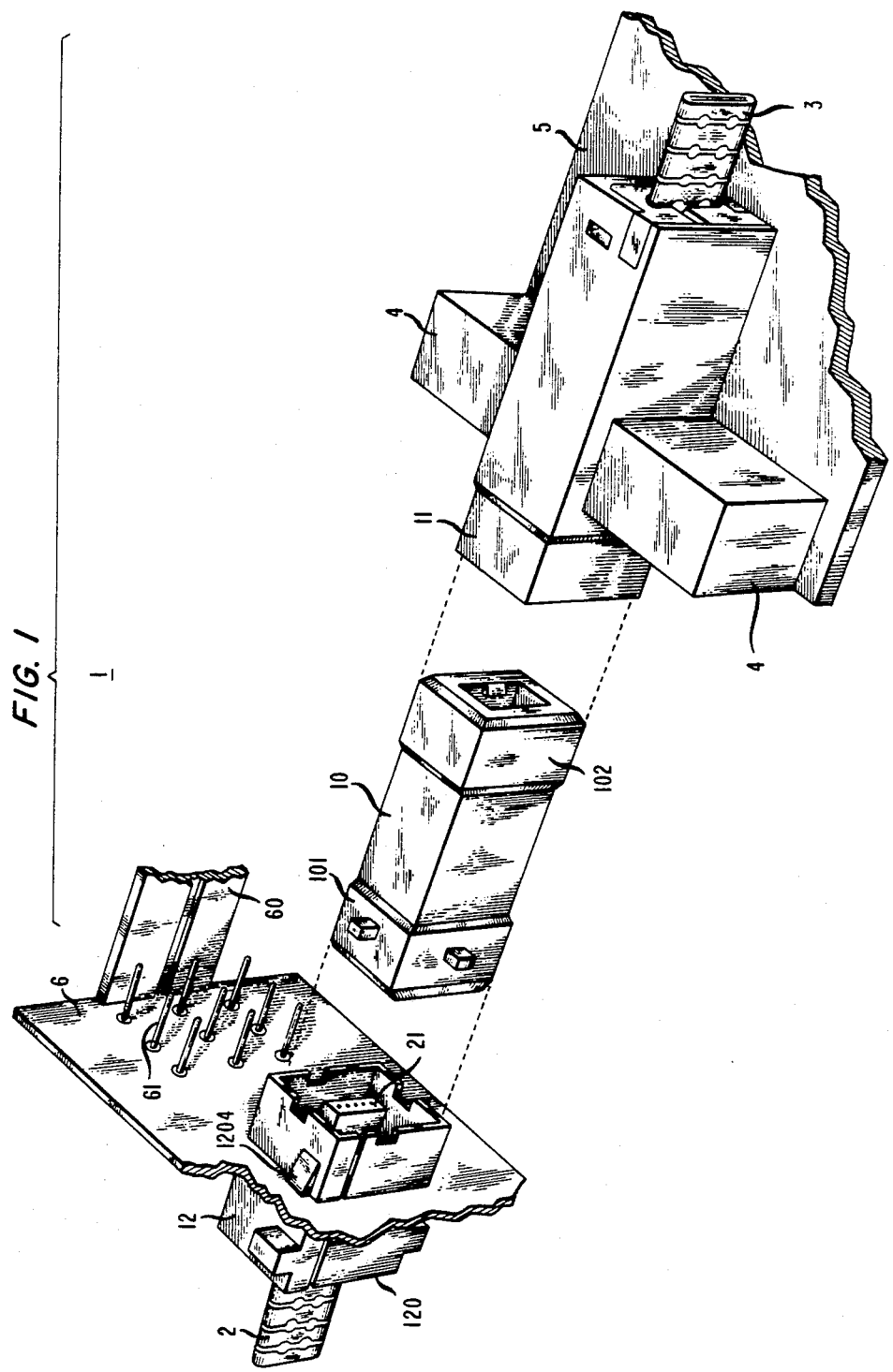
FIG. 1 illustrates connector apparatus embodying the principles of the instant invention, FIG. 2 sets forth an exploded view of members of the connector apparatus set forth in FIG. 1 for terminating a first optical fiber cable, FIG. 3 sets forth a detailed view of apparatus for enabling universal movement of a fiber terminating substrate device.

Referring to the drawing and more specifically to FIG. 1 of the drawing, connector apparatus 1 set forth therein is intended for use in interconnecting optical fiber cable 2 with optical fiber cable 3. In another embodiment of the invention connector apparatus 1 may be used to couple optical fiber 2 with a backplane 6 of equipment mounting apparatus that is arranged to slidably receive plug-in circuit board 5. Backplane 6 has a row and column configuration of pins 61 used to terminate conductors of convential multiwire cables or printed wiring circuitry of backplane 6. Connector 4 is arranged so that when plug-in circuit board 5 is inserted into guide member 60 of the equipment mounting apparatus, terminals of connector 4 engage corresponding ones of pins 61 and establish a convential electric circuit therefrom through connector 4 terminals with circuitry of circuit board 5.

Optical fiber connector apparatus 1, hereinafter referred to as connector 1, comprises a pair of plug members 11, 12 each arranged to hold and support a substrate 21, 31 terminating light carrying fibers of optical fiber cables 2,3. One plug member, for example plug member 12, may be used to terminate an optical cable 2 with backplane 6 and another plug member 11 may be combined with connector 4 of plug-in circuit board 5 and used to terminate light carrying fibers coupled with the apparatus of circuit board 5. In addition, connector 1 comprises a sleeve member 10 that is arranged to slidably receive substrates 21,31 of plug members 11 and 12 and apply spring forces on substrates 21,31 to axially align and optically couple together corresponding ones of the fibers terminated on substrates 21 and 31.

Figure 9:
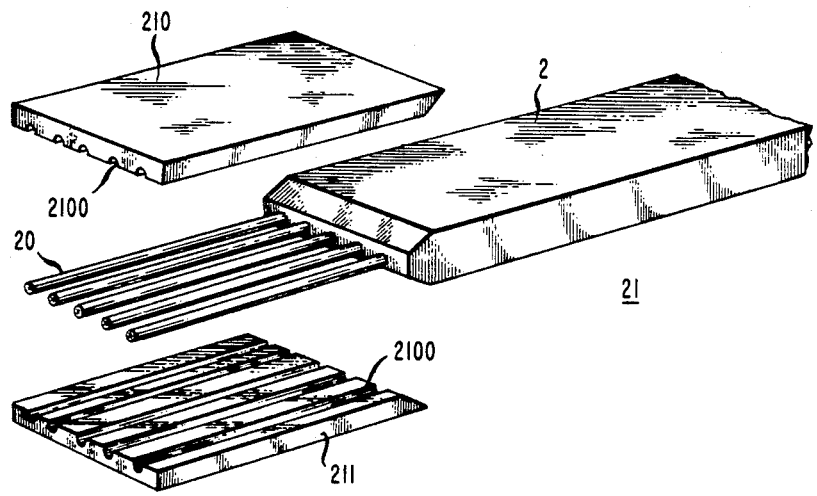
FIG. 9 is a perspective view illustrating assembly of an optical fiber terminating substrate device.

Referring now to FIG. 9 of the drawing, substrate 21 consists of a pair of chip devices 210, 211 constructed of silicon or similar type of material to form a generally rectangular configuration. Each chip device 210, 211 has a number of parallel channels 2100 formed on one surface thereof to each receive an individual light carrying fiber 20 or a light carrying fiber 20 located in a ribbon of optical fiber cable 2. Both chip devices 210, 211 are joined together sandwiching fibers 20 between them to form substrate 21. The end is then polished to form a planer surface containing the end of each fiber 20 which is positioned flush and in the plane of the planer end surface. Substrate 31 is identical to substrate 21.

Figure 2:
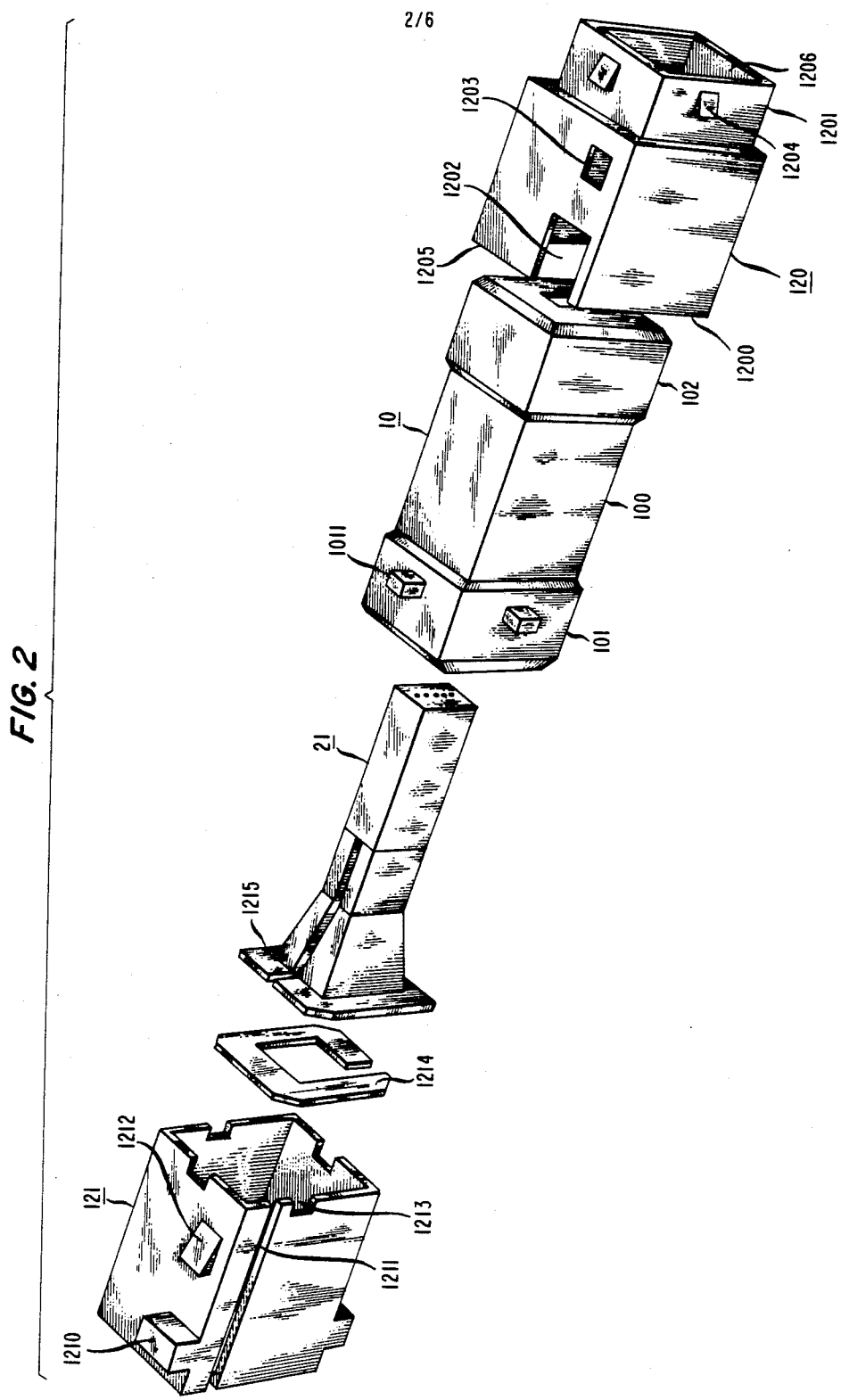
Figure 3:
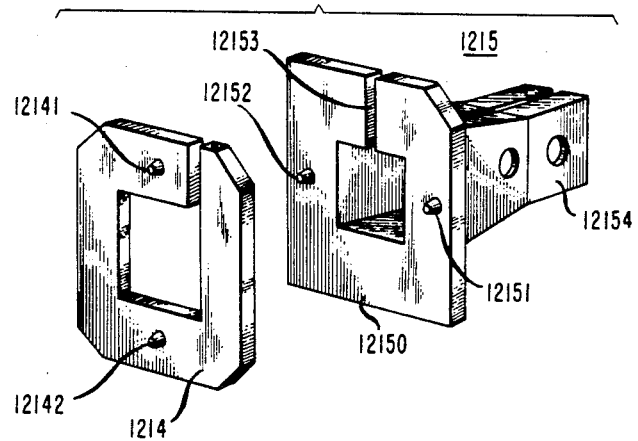
Figure 4:
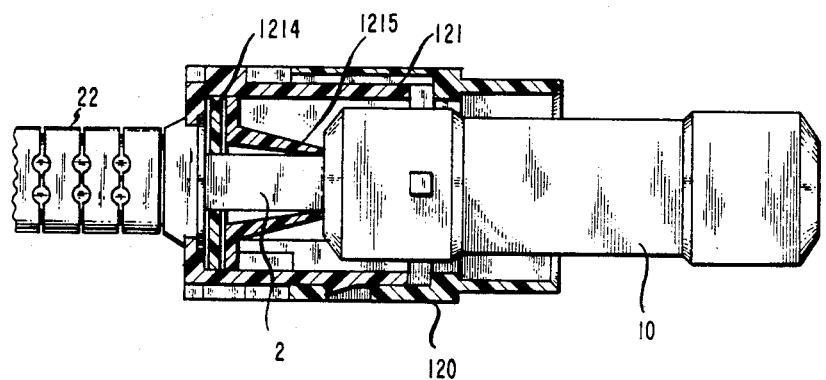
FIG. 4 is a partial sectional view of the assembled optical cable terminating members set forth in FIG. 2, FIG. 5 sets forth an exploded view of the members of the connector apparatus set forth in FIG. 1 for terminating a second optical fiber cable and for terminating light carrying fibers coupled with a circuit board.

As set forth in FIG. 2, plug member 12 comprises a generally truncated pyramid configured member 1215. Truncated pyramid member 1215, FIG. 3, has a keyed base section 12150 and is formed with a slot 12153 extending from base section 12150 along the side thereof to truncated end section 12154. In assembly, the fibers or fiber carrying ribbon of optical fiber cable 2 are positioned in and accepted by slot 12153 such that substrate 21 is supported at the truncated end 12154 with the polished end of substrate 21 extending perpendicularly outward with respect to base section 12150. Plug member 12 also has a retaining member 121, FIG. 2 of the drawing, intended for use in holding pyramid member 1215 such that supported substrate 21 is positioned to extend along a central axis thereof. Retaining member 121 has a generally rectangular configuration having an inner chamber sized to receive spacer member 1214 and truncated pyramid member 1215. Spacer member 1214, set forth in detail in FIG. 3 of the drawing, has a pair of spherically tipped pins 12141, 12142 formed thereon with each pin projecting perpendicularly outward from opposite sides of one surface of spacer member 1214. Similarly, a pair of pins 12151, 12152 each project perpendicularly outward from opposite sides of the bottom surface of pyramid base section 12150. Spacer member 1214 and pyramid member 1215, FIG. 2, are assembled within retaining member 121, FIG. 2, with spacer member 1214 positioned adjacent the pyramid base section 12150 and the end of retaining member 121 with pins 12141, 12142 rotated at right angles with respect to pins 12151, 12152. Spacer member pins 12141, 12142 act in concert with pyramid member pins 12151, 12152 to enable universal movement of fiber terminating substrate 21 about the central axis of retaining member 121. Although pins 12141, 12142 and 12151, 12152 are located on spacer member 1214 and pyramid member 1215 respectively, other arrangements would work equally well. For example, pins located on the edges of the rear wall of retaining plug 121 and the surface of pyramid member base section 1214 would enable spacer member to allow universal movement of substrate 21.

Retaining member 121, FIG. 2, also has a slot 1211 formed along one side thereof to enable the ribbon or fibers of an optical fiber cable to be located initially in the chamber so that spacer member 1214 and pyramid member 1215 can be aligned with and subsequently inserted into retaining member 121. Opposite surfaces of retaining member 121 are provided with a raised surface 1210 used for positioning retaining member 121 within housing 120 so that inclined tab 1212 can engage a corresponding opening 1203 of housing member 120.

Plug member 12 also includes housing member 120 which is arranged to receive sleeve member 10 in combination with retaining member 121 and truncated pyramid member 1215 coupled with the fibers of optical fiber cable 2. Housing member 120 has a first section 1201 with an outer surface sized for slidable insertion through a hole of a backplane such as backplane 6. Tabs 1204 positioned around the outer surface of section 1201 snaps in position after housing member 120 has been inserted into backplane 6 and locks housing member 120 into position. Sections 1200 and 1201 have interconnected internal chambers 1205 and 1206 with chamber 1205 sized for slidably receiving sleeve member 10 and retaining member 121 with fiber terminating substrate 21 engaged with sleeve member 10. Alignment channels 1202 are formed on opposite surfaces of section 1200 to receive raised surfaces 1210 of retaining member 121 and thereby enable inclined tab 1212 to engage corresponding hole 1203. Chamber 1206 is sized to slidably receive plug member 11 such that a fiber terminating substrate 31 of plug member 11 may be engaged with sleeve member 10 to optically couple together optical fiber cables 2 and 3.

Figure 5:
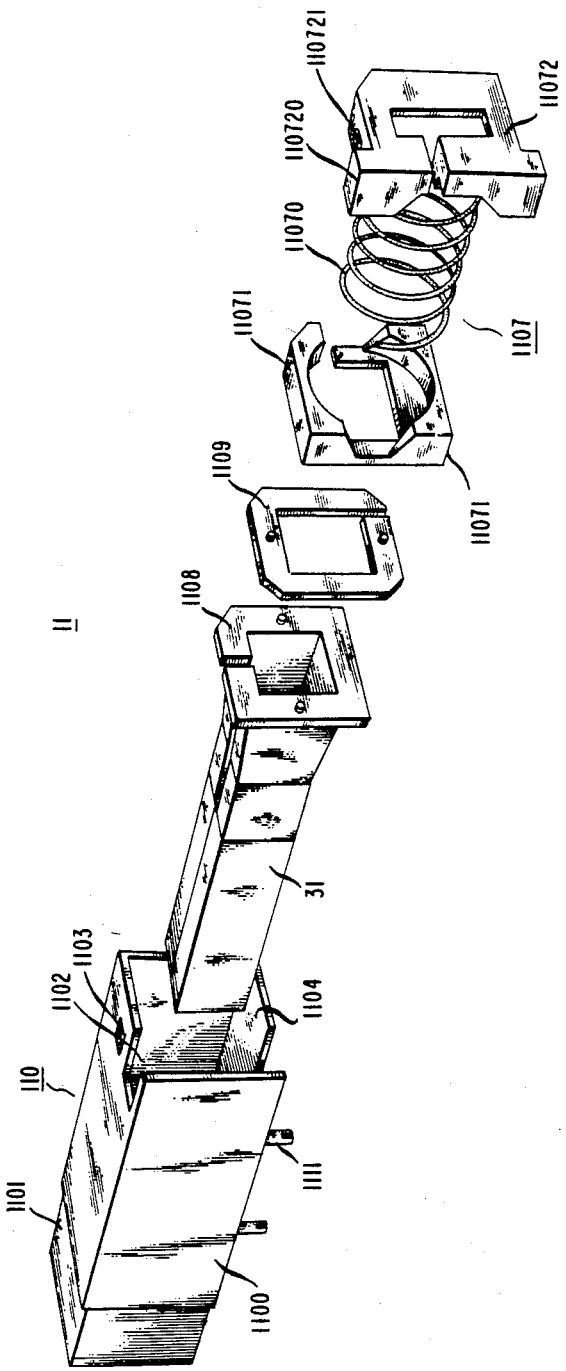

Plug member 11, set forth in FIG. 5, is used for holding and supporting substrate 31 used to terminate the fibers or ribbon of another optical fiber cable 3, or may as set forth in one embodiment of the invention, terminate fibers coupled with component apparatus located on circuit board 5. The apparatus comprises another truncated generally pyramid configured member 1108 constructed in the manner of pyramid member 1215 to accept fibers and support terminating substrate 31 at the truncated end thereof. A generally rectangularly configured retaining member 110 has a rear section 1100 extended into a smaller front section 1101 sized for slidable insertion, FIG. 2, into chamber 1206 of housing 120. Channel 1104, FIG. 5, extends from a front opening through retaining member 110 to an opening in the end of rear section 1100 and is sized to receive pyramid member 1108 and spacer 1109. In addition, plug member 11 may also include a spring assembly 1107 having a spiral spring 11070 abutted with spring seating member 11071 and spring retaining member 11072. Spring assembly 1107 is positioned in retaining member channel 1104 with spring seating member 11071 adjacent spacer member 1109 and with spring retaining member raised sections 110720 inserted into guide channels 1102 so as to enable tab members 110721 to engage holes 1103 and thereby lock spring retaining member 11072 within retaining member 110.

Figure 6:
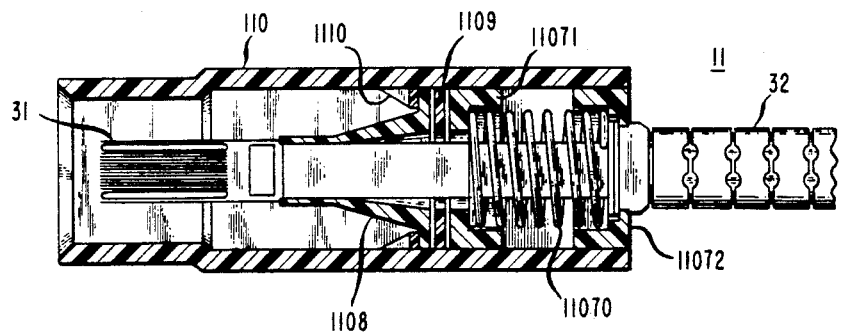
FIG. 6 is a partial sectional view of the assembled optical fiber cable and circuit board fiber terminating members set forth in FIG. 5.

As set forth in FIG. 6, the assembled plug member 11 holds pyramid member 1108 which supports fiber terminating substrate 31 positioned and extended along the center line of retaining member 110. Similarly to plug member 12, pins located on one surface of spacer member 1109 and positioned at right angles with respect to pins located on the base of pyramid member 1108 enable universal movement of fiber terminating substrate 31 about the center line of retaining member 110. Spiral spring assembly 1107 positioned adjacent spacer member 1109 exerts a force along the retaining member center line against spacer member 1109 to normally maintain the base of pyramid member 1108 in a fully extended position biased against retaining tabs 1110. The light carrying fibers or the ribbon carrying the fibers are protected by a bend radius limiter 32 which serves to prevent the flexing of fibers and ribbon extending outward the ends of plug members 11, 12 from exceeding a predefined radius of curvature.

The bottom surface of retaining member 110 may have perpendicular split pins 1111, FIG. 5 extending therefrom for use, FIG. 1, in affixing plug member 11 to circuit board 5. Plug member 11 may be located adjacent or formed as a part of connector 4 mounted on an edge of circuit board 5. Insertion of plug-in circuit board 5 into equipment mounting apparatus enables connector 4 and plug member 11 to slidably engage pins 61 and plug member 12, respectively, so that the circuitry and component apparatus located on circuit board 5 may be interconnected with the circuitry of backplane 6 and optical fiber cable 2.

Connector 1 also includes sleeve member 10 that is arranged to slidaby receive and apply quadrantal spring forces against fiber terminating substrates 21,31 to axially align and optically couple together corresponding fibers terminated on substrates 21,31. Sleeve member 10, FIG. 2, has a generally rectangular body 100 with one end 101 sized for insertion into the chamber of retaining member 121 of plug member 12 and with the opposite end 102 sized for slidable insertion into the chamber of retaining member 110 of plug member 11. End 101 has pin members 1011 extending vertically outward from the surface thereof for use in aligning sleeve member 10 with respect to housing 120.

Figure 7:
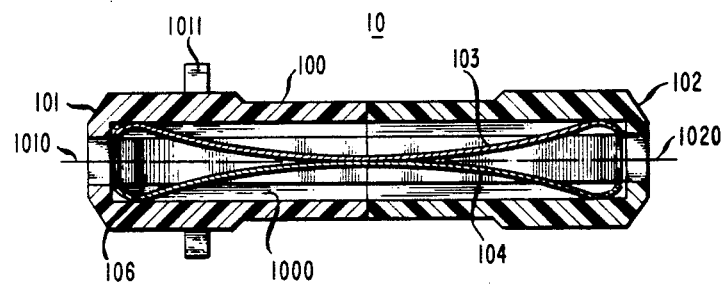
FIG. 7 is a sectional view of the optical fiber connector sleeve member set forth in FIGS. 1, 2 and 4.
Figure 8:
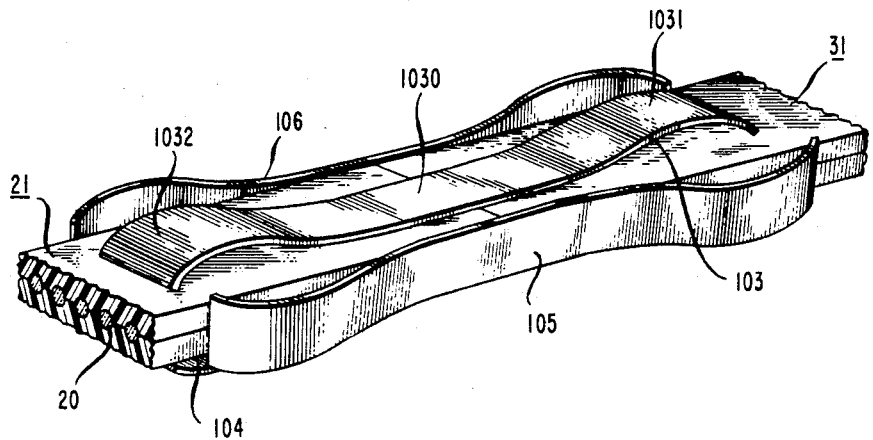
FIG. 8 is a perspective view illustrating the position of the arcuate spring members of the optical fiber connector sleeve member set forth in FIGS. 1, 2, 4 and 7.

Referring now to FIG. 7 of the drawing, sleeve member 10 has an inner channel 1000 formed along a center axis with openings 1010, 1020 at each end sized to slidably engage the truncated end of pyramid members 1215, 1108 and supported fiber termination substrates 21,31. Positioned within inner channel 1000 are four spring members 103,104,105,106 arranged to slidably engage fiber terminating substrates 21,31 and apply quadrantal forces thereto to axially align and optically couple the ends of the fibers terminated on substrates 21,31. Each spring member 103,104,105, 106 is a generally rectangular spring constructed of any one of a number of resilient materials and is of a type commonly referred to as a leaf spring. A spring member, such as spring member 103, FIG. 8, has a center arcuate section 1030 extended toward the center line of sleeve member 10 and has each end formed into a curved section 1031, 1032 used to pre-bias and hold spring member 103 in sleeve member channel 1000. The other spring member 104 of the first pair of spring members 103,104 is positioned within sleeve member channel 1000 directly opposite sleeve member 103 with the center arcuate section thereof extended toward the center line of sleeve member 10 to normally rest against arcuate section 1030 of spring member 103 in the relaxed state.

A second pair of springs 105,106 is positioned in sleeve member channel 1000 directly opposite each other with their respective arcuate sections extended toward the sleeve member center line and rotated to form a right angle with the first pair of spring members 103,104. In the relaxed state the arcuate sections of the second pair of spring members 105,106 extend toward the center line of sleeve member 10 and normally rest on the relaxed arcuate sections of the first pair of spring member 103,104. The slidable insertion of the fiber terminating substrates 21,31 in the appropriate ends of sleeve member 10 result in the engagement of substrates 21,31 with the first pair of spring members 103,104. Spring members 103,104 are compressed and apply forces to the top and bottom surfaces of both substrates 21 and 31 and operate to position the polished ends of substrates 21,31 together with the row of fibers terminated in substrate 21 vertically aligned with the row of fibers terminated in substrate 31. As the first pair of spring members 103,104 are compressed the second pair of spring members 105,106 are released to exert a second pair of forces at right angles with respect to the first pair of forces against the sides of both substrates to horizontally align each fiber on substrate 21 with a corresponding fiber on substrate 31. The combined action of spring members 103,104,105,106 generate quadrantal forces that are applied to substrates 21,31 slidably inserted in sleeve member 10 to axially align and optically couple together light carrying fibers of optical fiber cables 2,3.

Apparatus Assembly

Referring to FIG. 2 of the drawing, plug member 12 is assembled by aligning pins 1011 of sleeve member 10 with alignment channels formed on each side of the inner chamber 1205 of housing member 120. Sleeve member 10 is then inserted into housing member 120 such that alignment pins 1011 are located at the end of chamber 1205 with sleeve member end section 102 extended through chamber 1206 perpendicularly outward from housing member 120. Truncated pyramid 1215 with supported substrate 21 terminating fibers of optical fiber cable 2 is assembled with spacer member 1214 in retaining member 121. Raised surfaces 1210 of retaining member 121 are then aligned with alignment channels 1202 and retaining member 121 inserted in chamber 1205 of housing member 120 with the truncated end of pyramid member 1215 and supported substrate 21 slidably inserted in end section 101 of sleeve 10. Housing member 120 is then inserted into backplane with tabs 1204, FIG. 1, securing housing member 120, sleeve member 10, and optical fiber cable 2 to backplane 6.

Figure 10:
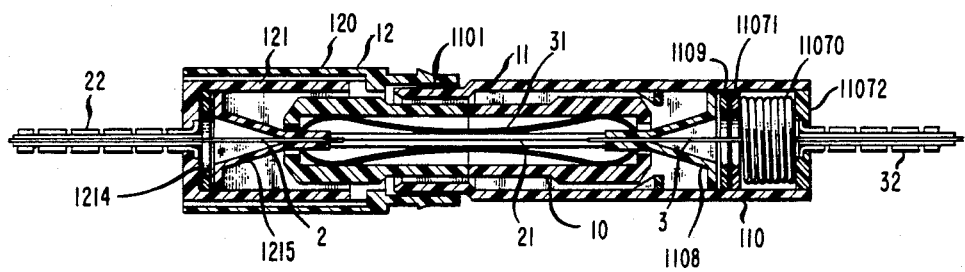
FIG. 10 is a sectional view of the assembled optical fiber connector set forth in FIG. 1.

Plug member 11, FIG. 6, is assembled by inserting truncated pyramid member 1108 and supported substrate 31 terminating fibers of optical fiber cable 3 into channel 1104 of retaining member 110 with the base of pyramid member 1108 engaging tab sections 1110. Spacing member 1109, FIG. 5, and spring assembly 1107 are positioned in channel 1104 adjacent pyramid member 1108 with spring retaining member 11072 in alignment slot 1102. Tab 110721 of spring retaining member 11072 engages hole 1103 to secure pyramid member 1108, space member 1109 and spring assembly 1107 in retaining member 110. Plug member 11 may, if desired, be mounted on circuit board 5, FIG. 1, by locating pin members 1111 into holes of the circuit board or circuit board connector 4. As plug-in circuit board 5 is inserted into equipment mounting apparatus an edge of circuit board 5 moves in a channel of alignment member 60 so that end section 102 of sleeve member 10 enters the open end of plug member 11. Supported substrate 31, FIG. 10, is slidably inserted into an end opening of sleeve member 10 to engage the spring members located in the channel of sleeve member 10. As plug member 11 is engaged with plug member 12 the trunciated end of pyramid member 1108 partially enters the end of sleeve member 10 and spiral spring 11070 compresses to exert a force along the center line of retaining member 110 against the base of pyramid member 1108. Sleeve spring members 103, 104,105,106 apply quandrantal forces, FIG. 8 on the surfaces of universally mounted substrates 21 and 31 such that the substrate ends are vertically and horizontally aligned with each fiber of cable 2 terminated on substrate 21 axially aligned and optically coupled with a corresponding fiber of cable 3 terminated on substrate 31. In the fully engaged positions, the end section 1101 of retaining member 110, FIG. 10, is inserted in chamber 1206 of housing member 120 and compressed spiral spring assembly 1107 maintains the end of substrate 31 abutted against the end of substrate 21. To disengage, plug member 11 and circuit board 5 are withdrawn to remove the end of retaining member 110 from housing member 120 and thereby disengage fiber terminating substrate 31 from the end of sleeve member 10.

SUMMARY OF THE INVENTION

It is obvious from the foregoing that the facility, economy and efficiency of connectors may be substantially enhanced by connector apparatus arranged for enabling optical fiber cables to be slidably coupled together. It is further obvious from the foregoing that connector apparatus arranged for enabling optical fibers coupled with apparatus on plug-in circuit boards to be slidably coupled with optical fibers terminated on the equipment mounting apparatus backplanes by axially aligning and optically coupling together the fibers improves the use of optical apparatus in electronic and communication networks.

While the apparatus of the invention has been disclosed in an optical fiber system it is to be understood that a light carrying fiber is a conductor of signals and that the present embodiment is intended to be illustrative of the principles of the invention and that other conductor coupling arrangements may be devised by those skilled in the art without departing from the spirit and scope of the invention.

What is claimed is:

1. Apparatus for interconnecting optical fiber cables comprising
    means for mounting and enabling universal movement of substrate devices terminating light carrying fibers of the optical fiber cables about a center line thereof, and
    means having opposing pairs of spring means for receiving said mounting and enabling means and for slidably self-aligning one of said mounting and enabling means by applying quadrantal spring forces on said terminating substrate devices to axially align and optically couple together corresponding fibers terminated on said substrate devices.

2. The optical fiber cable interconnecting apparatus set forth in claim 1 wherein said mounting and enabling means comprises
    means for accepting said light carrying fibers and supporting said substrate device terminating said fibers, and
    means for holding said accepting and supporting means with said fiber terminating substrate device extended along said center line thereof.

3. The optical fiber cable interconnecting apparatus set forth in claim 2 wherein said mounting and enabling means comprises
    means positioned in said holding means for enabling said universal movement of said terminating substrate device about said holding means center line.

4. The optical fiber cable interconnecting apparatus set forth in claim 3 wherein said receiving slidably self-aligning means comprises
    means having a channel formed therein along said center axis with an opening at each end for slidably receiving one of said substrate devices supported by said accepting and supporting means, and arcuate spring members positioned in said slidably receiving means channel for applying said quadrantal forces to a pair of said terminating substrate devices to axially align and optically couple ones of said fibers terminated on one terminating substrate device with corresponding ones of said fibers terminated on said other substrate device.

5. The optical fiber cable interconnecting apparatus set forth in claim 4 comprising housing means for retaining one of a pair of said holding means with said supported substrate device in engagement with said slidably receiving means and for enabling insertion of the other one of said holding means therein to slidably engage said supported substrate device thereof with said arcuate spring members.

6. The optical fiber cable interconnecting apparatus set forth in claim 5 wherein said other one holding means comprises spiral spring means positioned therein for exerting a force along said center axis against said accepting and supporting means to maintain the inserted termination substrate device in engagement with said spring means.

7. Apparatus for interconnecting an optical fiber cable through a backplane of equipment mounting apparatus with a circuit board comprising means for holding and supporting substrate devices terminating light carrying fibers of the optical fiber cables, means having opposing pairs of spring means for slidably receiving said substrate devices and applying quadrantal forces thereon to axially align and optically couple together corresponding ones of said fibers terminated on said substrate devices, and means insertable in the backplane for holding said slidably receiving means extended through the backplane and for receiving ones of said holding and supporting means with each said substrate device thereof engaged with said spring means of said slidably receiving means.

8. The optical fiber cable interconnecting apparatus set forth in claim 7 wherein said holding and supporting means comprises a truncated generally pyramid configured member having a base section and a slot formed along one side thereof for accepting ones of said fibers and supporting said substrate device terminating said one fibers to extend outward from the truncated end of said pyramid member, and a retaining member for holding said truncated pyramid member therein with said supported substrate device positioned along a central axis thereof.

9. The optical fiber cable interconnecting apparatus set forth in claim 8 wherein said holding and supporting means further comprises a spacer member positioned in said retaining member adjacent one end thereof and said truncated pyramid member base section for enabling universal movement of said supported substrate device about said retaining member central axis.

10. The optical fiber cable interconnecting apparatus set forth in claim 9 wherein said slidably receiving means comprises a sleeve member having an inner channel formed along a center axis thereof with an opening at each end for slidably receiving said supported substrate device and truncated end of said pyramid member, and arcuate spring members positioned in said sleeve member channel for applying said quadrantal forces to a pair of said supported substrate devices to axially align said pair of supported substrate devices and optically couple ones of said fibers terminated on one supported substrate device with corresponding fibers terminated on the other supported substrate device.

11. The optical fiber cable interconnection apparatus set forth in claim 10 wherein said holding and receiving means comprises a housing member having first and second generally rectangular sections with said first section having an outer surface for engaging the backplane and with said sections having interconnected chambers for slidably receiving said retaining members at each end thereof and said second member chamber formed for receiving said sleeve member with ends thereof extending into said chambers for receiving said supported substrate devices in slidable engagement with said sleeve arcuate spring members.

12. The optical fiber cable interconnection apparatus set forth in claim 11 wherein one of said retaining members comprises a spiral spring member positioned along said central axis thereof for maintaining a force against said held truncated pyramid member to maintain said supported substrate device in engagement with said sleeve arcuate spring members.

13. Connector apparatus for interconnecting an optical fiber cable through a backplane of equipment mounting apparatus with a circuit board comprising a first truncated generally pyramid configured member having a base section and a slot formed along one side thereof for accepting light carrying fibers of the optical cable and for supporting a substrate device terminating said cable fibers to extend outward from the truncated end thereof, a second truncated generally pyramid configured member having a base section and a slot formed along one side thereof for accepting light carrying fibers coupled with the circuit board and for supporting a substrate device terminating said circuit board fibers to extend outward from the truncated end thereof, a first retaining member for holding said first truncated pyramid member therein with said supported cable fiber terminating substrate device positioned along a central axis thereof, a second retaining member for holding said second truncated pyramid member therein with said supported circuit board fiber terminating substrate device positioned along a central axis thereof, a pair of spacer members each positoned in one of said first and second retaining members adjacent a corresponding first and second pyramid member for enabling universal movement of said fiber terminating substrate device about said retaining members central axis, a sleeve member having a generally rectangular channel formed along a center axis thereof with an opening at each end for slidably self-aligning said first and second fiber terminating substrate devices and truncated end of said pyramid members, a first pair of opposed leaf spring members positioned in said sleeve member rectangular channel with each spring member having an arcuate section extending toward said sleeve member center axis for applying a vertical aligning force on said substrate devices slidably inserted into said sleeve member.

a second pair of opposed leaf spring members positioned in said sleeve member rectangular channel and rotated at a right angle with respect to said first pair of leaf spring members with each spring member having an arcuate section extending toward said sleeve member center axis for applying a horizontal aligning force on said substrate devices slidably inserted into said sleeve member, a housing member having first and second generally rectangular sections with said first section having an outer surface sized for insertion through the backplane and with said sections having interconnected chambers formed for receiving said sleeve member with said second section chamber sized for receiving said first retaining and held pyramid member with said cable fiber terminating substrate device slidably engaged with said pairs of leaf spring members and with said first section chamber sized for slidably receiving said second retaining and held pyramid member to engage said circuit board fiber terminating substrate device with said pairs of leaf spring members to axially align and optically couple together corresponding ones of said optical cable and circuit board fibers, and spiral spring means positioned in said second retaining member adjacent the end thereof and one of said spacer members for exerting a force along said second retaining member center axis to maintain said circuit board fiber terminating substrate device engaged with said sleeve member leaf spring members and abutted against said optical cable fiber terminating substrate device.

14. The connector apparatus set forth in claim 13 wherein said sleeve member comprises pin members extending vertically outward from surfaces of one end of said sleeve member at right angles with respect to each other for aligning said sleeve member to receive said fiber terminating substrate devices, and wherein sidewalls of said housing member second section chamber is formed with pairs of opposite channels positioned at right angles with respect to each other for receiving said sleeve aligning pin members.

15. Connector apparatus for interconnecting signal carrying conductors through a backplane of equipment mounting apparatus comprising a pair of plug members each having a chamber, a pair of pyramid configured members each arranged to accept ones of the signal carrying conductors and support a substrate device terminating said conductors and each positioned in one of said plug member chambers to enable universal movement of said substrate device about a center line of said plug member, a sleeve member having openings at each end thereof for receiving ones of said conductor terminating substrate devices and having spring members for applying quadrantal spring forces thereto to axially align and couple together corresponding conductors terminated on said substrate devices; and a receptacle member having first and second sections with said first section sized for engagement with the backplane and with said sections having interconnected chambers for holding said sleeve member extending through the backplane and with said chambers each sized for receiving one of said plug members to slidably insert said conductor terminating substrate devices into said sleeve member.

16. The connector apparatus set forth in claim 15 wherein sleeve spring members comprises a first pair of opposite leaf springs located in an inner channel of said sleeve member with each first spring having an arcuate section extending toward a center line of said sleeve member for exerting first alignment forces on said conductor terminating substrate devices and, a second pair of opposite leaf springs located in said sleeve member inner channel at right angles with respect to said first pair of springs with each second spring having an arcuate section extending toward said sleeve member center line normally resting on relaxed ones of said first springs for exerting second alignment forces on said conductor terminating substrate devices at right angles with respect to said first alignment forces as said conductor substrate devices are slidably engaged with said first and second pairs of springs.

* * * * *